Feb. 13, 1934.  T. W. PAUL  1,946,543
MOWER
Filed Sept. 26, 1932  4 Sheets-Sheet 4

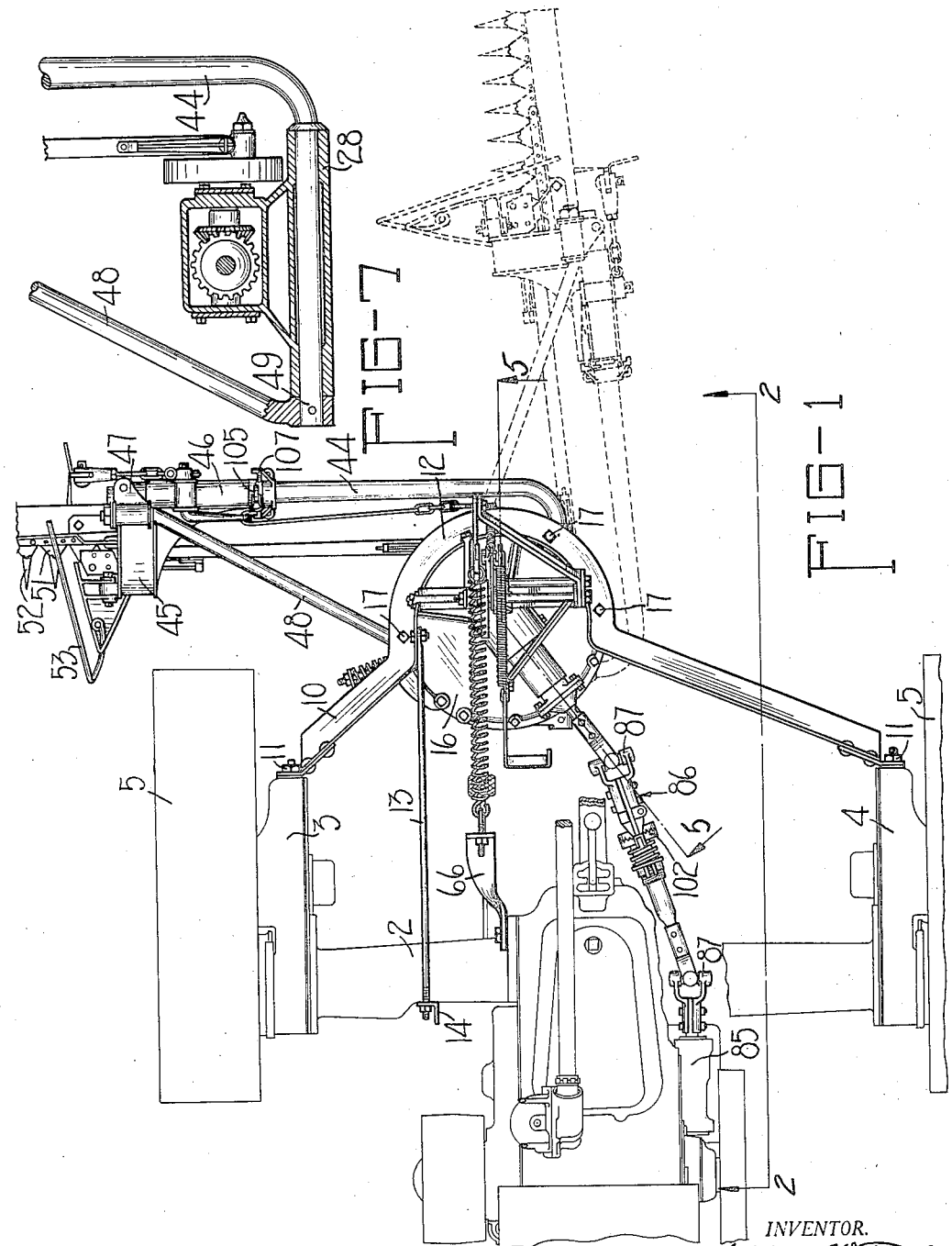

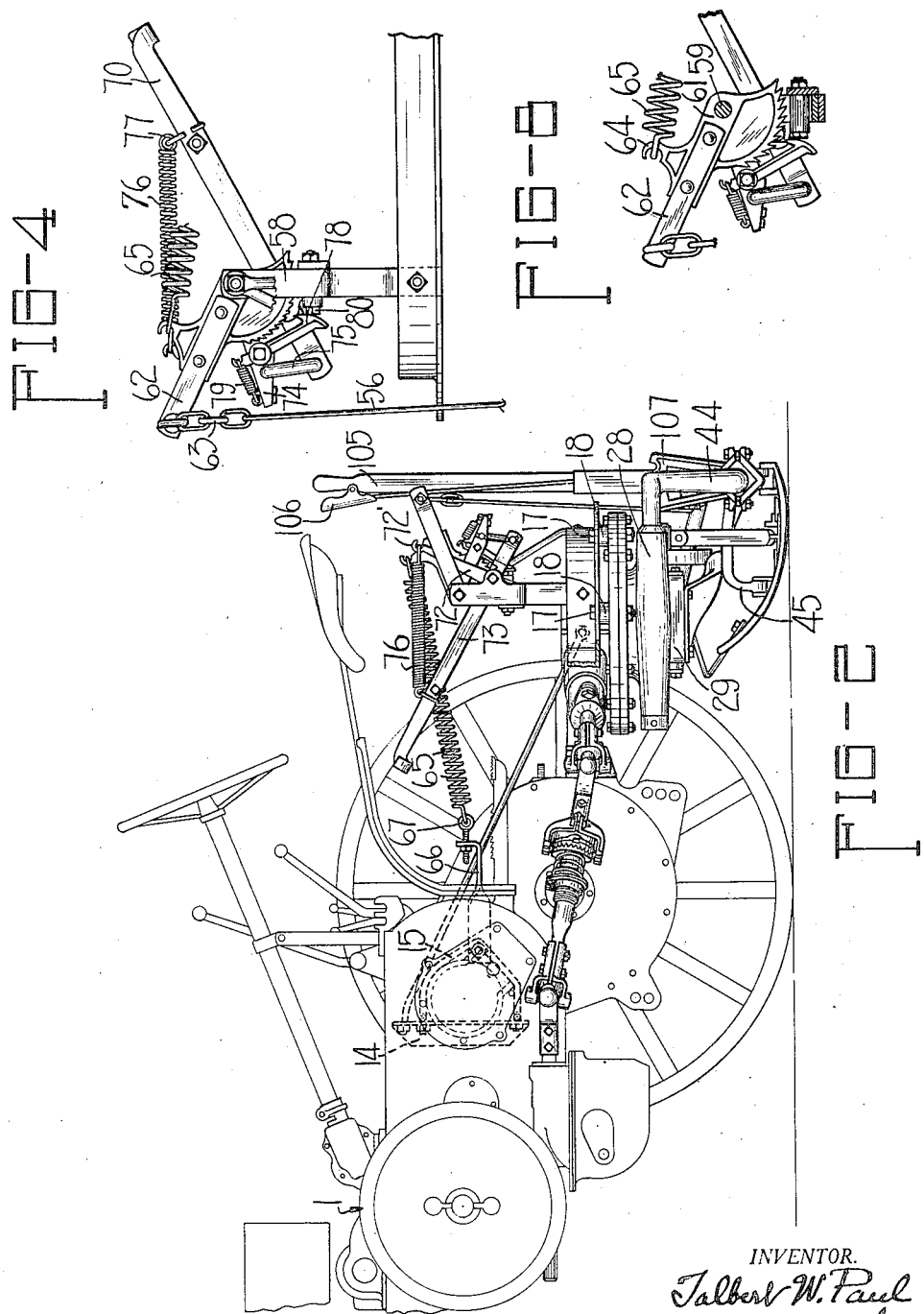

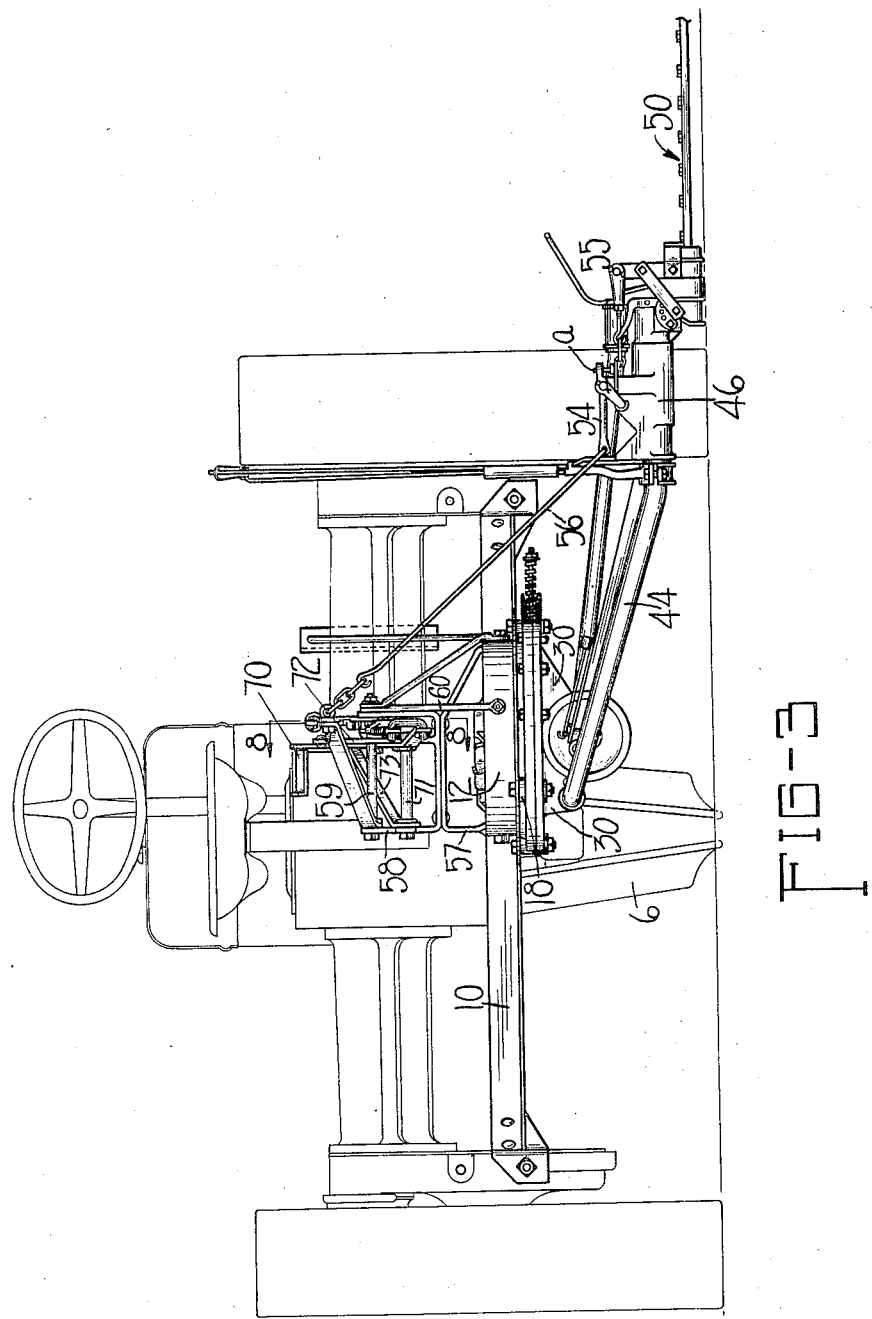

WITNESS
WALTER ACKERMAN

INVENTOR.
Talbert W. Paul
BY Brown, Jackson
Boettcher & Dienner
ATTORNEYS.

Patented Feb. 13, 1934

1,946,543

UNITED STATES PATENT OFFICE 1,946,543

MOWER

Talbert W. Paul, Kansas City, Kans., assignor to Deere & Company, Moline, Ill., a corporation of Illinois Application September 26, 1932
Serial No. 634,829

20 Claims. (Cl. 56—25)

This invention relates to mowers, more particularly to mowers of the type adapted to be mounted directly upon a tractor and operated by power derived from the power take-off of the tractor, and the principal object of the invention resides in the provision of a new and improved mower of this type.

Broadly speaking, the present invention improves upon the mower disclosed in my copending application, Serial No. 403,942, filed November 1, 1929.

In its preferred form, the improved mower comprises a frame adapted to be rigidly secured to the tractor. This frame carries a turntable arranged for rotation about a vertical axis, but normally restrained from such rotation by a spring release means which is operative to release the turntable when the cutter bar of the mower strikes an obstruction. A drag bar is pivotally mounted upon the turntable for movement about a horizontal axis, and a ground engaging shoe arch is pivotally mounted upon the free end of this drag bar for rotation thereabout. The cutter bar is pivoted to the shoe arch and capable of swinging movement with respect thereto. Rotation of the shoe arch about the drag bar tilts the cutter bar with respect to the ground.

The shoe also contains a system of links and levers that are connected to the cutter bar and connected to raising means located upon the framework of the mower. This means includes a foot lever, which is normally disengaged from the remainder of the lifting device to permit the shoe arch and cutter bar to move vertically with respect to the tractor without moving the foot lever. Such movement of the cutter bar results when the tractor is moved over uneven ground or when the shoe rides over an obstruction.

Power for driving the knife is derived from the power take-off of the tractor through an articulated shaft which terminates in a propeller shaft journaled in the stationary part of the turntable structure. This propeller shaft is connected by suitable gears to a vertical shaft disposed concentrically of the axis of rotation of the turntable, and the vertical shaft is in turn geared to a crank shaft that drives a pitman connected to the knife. The articulated shaft is provided with a slip clutch which disconnects the power from the knife when the cutter bar becomes clogged. When the cutter bar strikes an obstruction and is moved about the axis of the turntable and rearwardly of the tractor, power is not disconnected from the knife. The mower may be restored to its normal position by backing the tractor a short distance, which movement rotates the turntable and parts carried thereby back into their normal position.

My invention will be best understood by reference to the accompanying drawings, in which a preferred embodiment of it is shown by way of example and in which:

Figure 1 is a fragmentary plan view of the mower attached to a tractor;

Figure 2 is a side elevational view of the mower and a part of the tractor;

Figure 3 is a rear elevational view of the mower and tractor;

Figure 4 is a fragmentary elevational view showing the cutter bar lifting mechanism and drawn to an enlarged scale;

Figure 7 is a cross sectional view taken substantially along the line 7—7 of Figure 5 looking in the direction of the arrows; and Figure 8 is a fragmentary view of the cutter bar lifting segment shown in Figure 4.

Figure 5:
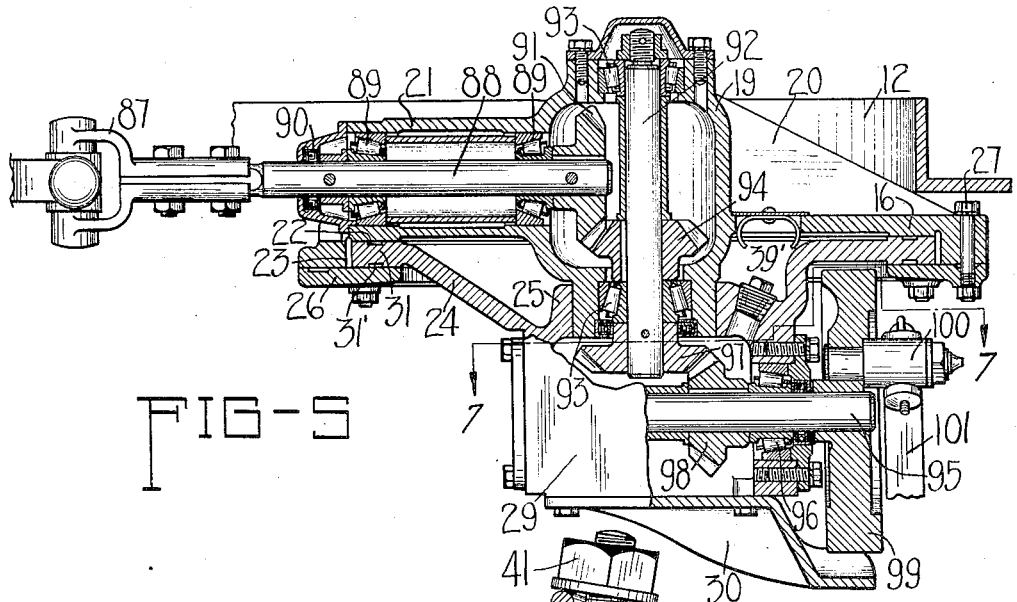
Figure 5 is a cross sectional view taken substantially along the line 5—5 of Figure 1 looking in the direction of the arrows and showing the power drive mechanism.
Figure 6:
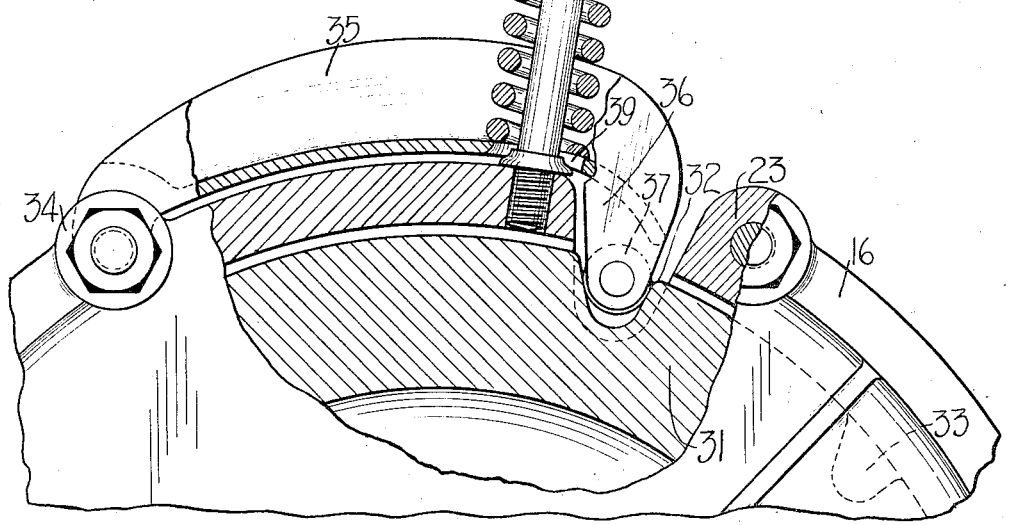
Figure 6 is a fragmentary view, partly in section, and showing the turntable overload release mechanism drawn to an enlarged scale.

Referring now to the drawings in more detail, the tractor, indicated generally at 1, comprises a rear or driving axle casing 2, to the opposite ends of which driving chain housings 3 and 4 are fixed. Propeller wheels 5 are journaled adjacent these driving chain casings 3 and 4 to support the rear end of the tractor. Dirigible wheels 6 support the opposite end of the tractor, these wheels being shown as closely spaced wheels forming a so-called tri-cycle tractor. The mower of my invention may be attached to a conventional four-wheeled tractor, as well as to the specific machine shown by way of example.

The mower of my invention comprises a main frame member 10 which is fixed to driving chain housings 3 and 4 by suitable bolts 11. This frame member is formed from a piece of angle stock and extends transversely of the tractor. A semicircular portion 12 of the member 10 is located centrally of the tractor and is supported by a tension rod 13 which is suitably fixed to the flange of the portion 12 and to an angle bar 14 on the axle casing 2 of the tractor. As will be seen in Figure 2, the angle bar 14 is secured to the axle casing by convenient means, such as the U-bolt 15, which encircles the casing and extends through perforations in the bar. The frame member 10 is thus rigidly secured to the tractor.

A generally circular mounting plate 16 registers with and is fixed in the circular portion 12 of the frame 10 by bolts 17 which extend through the flange of the frame member and through spacing bosses 18 located upon the upper face of the plate. Centrally located in the mounting plate 16 is a generally cylindrical hollow casing 19. The axis of the casing 19 is disposed vertically, and reinforcing flanges 20 connect the upper edge of the casing to the plate 16. A second cylindrical casing 21 is formed on the upper face of the plate 16 and is disposed with its axis extending radially from the center of that plate. This casing 21 is hollow and communicates with the inside cavity of casing 19, with which it is integrally formed. The lower portion of the casing 19 extends downwardly below the lower face of the mounting plate 16.

As will be seen in Figure 5, the lower face of the plate 16 is shaped to form a circular recess or bearing surface 22. A cylindrical flange 23 projects from the outer edge of this surface 22. A turntable plate 24 is provided with a centrally located bushing 25 which registers with the projecting end of the casing 19 to journal the turntable for rotation on the axis of that casing. A ring 31 is formed on the outer periphery of the turntable plate 24, and this ring is registered with the bearing surface 22 and fitted within the flange 23. A bearing annulus 26 fits against the lower face of the ring 31 and against the flange 23 of the mounting plate 16, being held on the flange by bolts 27, to secure the turntable upon the mounting plate. The ring 31 contains an annular recess 31' for receiving a suitable lubricant by which free movement of the turntable is assured.

As will be seen in Figures 2, 3 and 5, the lower portion of the turntable plate 24 contains a pivot boss 28 and a gear box, indicated generally at 29 in Figure 5. Suitable reinforcing flanges 30 extend between the journal boss, the gear box, and the turntable plate 24.

As shown, both the mounting plate 16 and the turntable plate 24 are castings, preferably composed of iron. These parts may be made in any other preferred manner within the teachings of my invention, and the particular design shown may be modified to facilitate such mode of fabrication.

The ring 31 of the turntable plate 24 contains a plurality of identations 32 and 33 extending radially inwardly from its outer edge. The mounting plate 16 contains a boss 34 in which a latch lever 35 is suitably pivoted. This latch lever is arcuate in shape and terminates in a pair of inwardly projecting parallel arms 36. A roller 37, pivotally mounted between these arms 36 at the free ends thereof, registers with one of the openings 32 or 33 in the ring 31. A bolt 38 is threaded into the flange 23 of the mounting plate 16 and extends through an opening 39 in the latch lever 35. A compression spring 40 encircles the bolt 38 and engages the web portion of the latch lever 35, being held thereagainst by a nut 41 threaded upon the bolt 38. A spring 40 is thus made to press the roller 37 into the indentation 32 in the turntable ring under pressure to lock the turntable against rotation, for a purpose which will presently appear. This pressure is varied by adjustment of the nut 41.

As will be seen in Figures 1, 2, 3 and 7, the pivot boss 28 of the turntable plate receives the short leg of a generally L-shaped drag bar 44, thereby pivotally mounting the bar upon the turntable. A ground engaging shoe arch 45 is journaled upon the free end of the drag bar 44 by a suitable journal boss 46. The shoe arch is held upon the bar 44 by a clamping member 47 fixed to the end of the bar 44 that projects through the journal boss 46. This clamping member 47 also serves to secure one end of a tension rod 48 to the free end of the drag bar 44. The opposite end of the tension bar 48 is fixed to the end 49 of the drag bar 44 that projects through the pivot boss 28 upon the turntable. Bars 48 and 44 together form a generally triangular shaped rigid support that is pivotally mounted upon the turntable and upon which the shoe arch 45 is journaled.

The cutter bar, indicated generally at 50, is pivotally mounted upon the shoe arch 45 for swinging movement about a horizontal axis extending longitudinally of the tractor. The cutter bar 50 comprises the usual knife 51 and guards 52, which are of common form and need not be explained in detail herein. A suitable guide 53 is secured to the shoe pivoted to the shoe arch 45 and serves to guide the grass that is being cut into the cutter bar 50.

It will be seen that the cutter bar is secured to the tractor through the agency of the drag bar 44 and the turntable 24, and that the cutter bar is movable about a horizontal axis disposed longitudinally of the tractor and also movable about a vertical axis. Normally, the cutter bar is disposed at right angles to the direction of travel of the tractor, being retained in this position by the spring pressed latch 35 acting upon the turntable 24. Should the guards 52 strike an obstruction which places it under abnormal stresses, the tension of spring 40 will be insufficient to prevent the sides of the slot 32 from camming the roller 37 out of engagement therewith, and the turntable will be unlocked so that it is free to rotate about its vertical axis. The cutter bar is then free to rotate rearwardly of the tractor into the position in which it is shown in dotted lines in Figure 1, and the obstruction may thus be cleared. As soon as the obstruction has been cleared, the cutter bar may be restored to its normal position in a simple manner, as will presently appear.

The cutter bar 50 is swung with respect to the shoe arch 45 by a bell crank lever 54 journaled upon the shoe arch and connected to the sickle by suitable links 55. A tension rod 56 is pivoted to the free end of the lever 54 to operate the same to raise the cutter bar and shoe arch, this rod 56 also serving to support a part of the weight of these devices, as will presently appear.

As will be seen in Figures 3 and 4, a U-shaped bracket 57 is securely fixed to the flange of the circular portion 12 of the frame 10, this bracket being disposed with its closed end uppermost. A second generally U-shaped bracket 58 is fixed to the bracket 57, the bracket 58 being disposed with its open end uppermost. A shaft 59 is journaled in the bracket 58 near the open end thereof. Suitable braces 60 are secured to the bracket 58 and to the circular portion 12 of the frame 10 to hold the shaft 59 in fixed position relative to the frame.

As will be seen in Figures 4 and 8, a sector 61 is journaled upon the shaft 59, and a lifting arm 62 is fixed upon this segment 61. The tension rod 56 is secured to the lifting arm 62 by links 63.

Segment 61 contains a hook 64, to which one end of a spring 65 is secured. The opposite end of this spring 65 is fixed to a bracket 66 by a screw eye 67 and nuts, the screw eye permitting adjustment of the tension of the spring. The bracket 66 is fixed upon the framework of the tractor, and in the example shown is fixed to the differential housing of the tractor. The tension of spring 65 tends to rotate segment 61 in a clockwise direction about the shaft 59, to thereby raise the lifting arm 62. This places rod 56 under tension to support a portion of the weight of the shoe and the sickle. By this arrangement, the pressure of the shoe on the ground is lowered and the frictional drag on the shoe reduced.

To facilitate raising the cutter bar when the mower is being turned or when it is desired to pass the cutter bar over the top of a low obstruction, I have provided a foot lever 70 which is journaled upon a shaft 71. The shaft 71 is supported directly beneath the shaft 59 by one side leg of the U-shaped bracket 58 and by an intermediate leg 72, this latter leg rising out of the closed end of the bracket 58 and extending upwardly and backwardly therefrom and terminating in a hook 72'. Foot lever 70 is composed of two member, 70 and 73, which are spaced apart from the shaft 71 to hold the lever in fixed position radially with respect thereto.

A short lever 74 is journaled upon the shaft 59 and disposed adjacent to the segment 61. The lower end of foot lever 70 is connected to the short lever 74 by a suitable link 75. A spring 76, fastened at one end to the hook 72' upon the bracket member 72, is secured to the foot lever by a suitable clamp 77 and serves to lift the forward end of the lever by rotating the same in a counter clockwise direction about the shaft 71.

Pivotally mounted upon the short lever 74 is a pawl 78 which is biased by spring 79 into engagement with the teeth of the sector 61. However, when the foot lever 70 is rotated into its normal position, pawl 78 engages an adjustable stud 80 which is mounted upon the bracket member 72, and the pawl is moved out of engagement with the segment. Through this arrangement, when the foot lever is in its normal position it is entirely disengaged from the segment 61. Should the ground engaging shoe 45, upon which the sickle is mounted, rise with respect to the tractor, as it will when the tractor is driven over uneven ground, or when the shoe strikes an obstruction, segment 61 can move under the action of spring 65 without moving the foot lever.

When it is desired to raise the cutter bar, as is the custom when the mower is being turned, foot lever 70 is rotated in a clockwise direction about the shaft 71. Lever 74 is simultaneously rotated, the pawl 78 is moved out of engagement with the stud 80, and spring 79 revolves the pawl about its pivot into engagement with the teeth of the sector 61. Further movement of the foot lever carries the segment 61 with it, rotating that segment in a clockwise direction about the shaft 59, to raise lifting arm 62. Rod 56 is thereby placed in tension to raise the shoe arch 45 and cutter bar 50 as a unit and subsequently to raise the cutter bar with respect to the shoe arch in the usual manner.

By virtue of the above described construction, the cutter bar may be raised through its full range of movement by successive operations of the foot lever 70. By depressing the foot lever to raise the cutter bar to one height, quickly releasing it and then depressing the lever again, the pawl 78 will be caused to engage one of the lower notches in the sector 61, whereupon the second operation of the foot lever 70 will raise the cutter bar to a higher elevation.

It will be noted that the mechanism for lifting the sickle is mounted securely upon the stationary frame of the mower and consequently its position is not altered by the backward movement of the cutter bar when an obstruction is encountered. It will be further noted that as the cutter and drag bar move about the vertical pivot on the turntable 24, the distance between the free end of the crank 54 and the lifting arm 62 is decreased, since the connection of the tension rod 56 to the lifting rod 62 is disposed rearwardly of the axis about which the cutter bar is moving. This tends to permit the cutter bar and shoe arch to move downwardly, and as a result the pressure of these devices on the ground is increased. A slight backward movement of the tractor will push the cutter bar against the ground and cause the same to be rotated forwardly of the tractor, that is to say, into the normal position in which it is shown in full lines in Figure 1. Thus, when the cutter bar has engaged an obstruction and released itself therefrom, it is only necessary to back up a few feet to restore the mower to its normal condition in readiness to continue operation.

Power for driving the knife is derived from the power take-off 85 of the tractor through an articulated shaft, indicated generally at 86. This shaft contains universal joints 87, one of which is secured to the power take-off shaft of the tractor and the other secured to the drive shaft 88 which is journaled in the casing 21 by suitable bearings 89. The casing 21 is filled with a suitable bearing lubricant held therein by a retainer cap 90 through which the shaft 88 projects.

Shaft 88 extends into the vertically disposed casing 19 of the mounting plate 16, and a bevel gear 91 is fixed to the projecting end of the shaft. A vertical shaft 92 is journaled in the casing 19 by suitable bearings 93 and projects beyond the casing 19 into the gear box 29. A bevel gear 94, mounted upon the shaft 92, meshes with the bevel gear 91 to connect shaft 92 to the shaft 88.

Within the gear box 29 is a propeller shaft 95 journaled in suitable bearings 96 and projected outwardly from the gear box through a suitable grease retainer. A bevel gear 97 mounted on the shaft 92 and a bevel gear 98 mounted on the shaft 95 connect these two shafts together. The casing 16 and gear box 29 are filled with a lubricant which may be introduced through the plug 39'.

A fly wheel 99 is mounted upon the projecting end of the shaft 95. This fly wheel carries a crank pin 100 upon which a pitman rod 101 is pivotally secured. The opposite end of the pitman 101 is connected to the knife 51 by the usual ball and socket connection.

The articulated shaft 86 is provided with a slip clutch 102, so that in the event the cutter bar becomes clogged, the clutch disconnects the knife from the power take-off of the tractor and thereby prevents damage to the clogged cutter bar.

It will be noted that the shaft 92 is journaled concentrically of the axis about which the turntable 24 revolves. Through this arrangement, the turntable can revolve about its axis, as it does when the cutter bar engages an obstruction, without disconnecting the power supply driving the sickle. Thus, when the cutter bar is cleared from the obstruction and restored to its normal position by backing the tractor, the knife is immediately ready for operation and the delay occasioned by striking the obstruction is minimized.

The tractor, shown by way of example, is provided with a power take-off 85 located upon the left-hand side thereof, and the axis of the shaft 82 is pointed in the general direction of this power take-off. In certain instances the power take-off may be located elsewhere upon the tractor, for example, on the right-hand side of the same. In all instances the axis of the shaft 88 should point in the general direction of the power take-off. This is accomplished by removing the bolts 17 and turning the mounting plate 16 so as to bring the shaft 88 into the desired position. Turning the mounting plate 16 alters the position of the spring pressed retaining latch 35 by which the turntable is locked in its normal position. I have provided a plurality of recesses in the ring 31 of the turntable, of which recesses 32 and 33 are examples. Movement of the mounting plate 16, to align it with the power take-off, brings the roller 37 into registration with another one of the recesses in the turntable plate, for example, with the recess 33, so that the turntable may be locked in its normal position.

In mowers of this kind it is frequently desirable to tilt the cutter bar by rocking the same about a horizontal axis disposed transversely of the tractor. To this end I have provided a lever 105 fixed upon the mounting bushing 46 of the shoe arch 45 and equipped with a spring pressed detent which is actuated by the hand lever 106. Secured upon the drag bar 44 is a sector 107 with which the detent on the lever 105 is adapted to be engaged. By releasing the detent from this sector and moving the lever 105, the cutter bar 50 may be tilted by rotating the shoe arch about the axis of the drag bar 44. Inasmuch as the tension rod 48 is secured to the free end of the drag bar rather than to the shoe arch 45, the presence of the rod 48 does not interfere with the rotation of the shoe arch about the axis of bar 44. When the cutter bar strikes an obstruction and is rotated into the position in which it is shown in dotted lines in Figure 1, lever 105 travels with the drag bar 44. This is advantageous, in that the lever 105 may be used as a handle for manually swinging the drag bar and cutter bar back into their normal position, should it be desirable to do so.

What is claimed is:

1. In a mowing machine, a frame, a turntable mounted upon said frame for movement around a vertical axis, a transversely extending cutter bar connected with the turntable for vertical movement in a transverse vertical plane, and means mounted on said frame for raising said cutter bar.

2. In a mowing machine, a frame, a turntable mounted upon said frame for movement around a vertical axis, a transversely extending cutter bar connected with the turntable for vertical movement in a transverse vertical plane, yieldable means engaging said turntable to hold the same against turning on said pivotal axis when the cutter bar is in a normal position, said means yielding to permit the turntable to turn when said cutter bar strikes an obstruction, and means mounted on said frame for raising said cutter bar.

3. In a mowing machine, a frame, a turntable mounted upon said frame for movement around a vertical axis, a transversely extending cutter bar connected with the turntable for vertical movement in a transverse vertical plane, yieldable means engaging said turntable to hold the same against turning on said pivotal axis when the cutter bar is in a normal position, said means yielding to permit the turntable to turn when said cutter bar strikes an obstruction, and means mounted on said frame for supporting a part of the weight of said cutter bar, said means acting to lessen the weight so supported responsive to movement of said turntable to facilitate restoring the cutter bar to said normal position by a reverse movement of the machine.

4. In a mowing machine, a frame adapted to be fixed upon a tractor, a casing fixed on said frame, a turntable journaled in said casing for rotation about a vertical axis, a boss on said turntable disposed below said casing, a drag bar journaled in said boss for movement about a horizontal axis, a shoe arch journaled upon said bar adjacent the free end thereof, a tension rod fixed to the ends of said drag bar and extending therebetween, a cutter bar pivoted to said shoe for swinging movement about a horizontal axis, and means for rotating said shoe around the axis of said drag bar to incline the pivotal axis of said cutter bar out of horizontal.

5. In a mowing machine, a frame adapted to be fixed upon a tractor, a casing fixed on said frame, a turntable journaled in said casing for rotation about a vertical axis, a boss on said turntable disposed below said casing, a drag bar journaled in said boss for movement about a horizontal axis, a shoe arch journaled upon said bar adjacent the free end thereof, a tension rod fixed to the ends of said drag bar and extending therebetween, a cutter bar pivoted to said shoe for swinging movement about a horizontal axis, a lever on said shoe for rotating the shoe around the axis of the bar upon which it is journaled, and means on said bar for locking said shoe with respect to the bar.

6. In a mowing machine, a frame adapted to be fixed upon a tractor, a casing fixed on said frame, a turntable journaled in said casing for rotation about a vertical axis, a boss on said turntable disposed below said casing, a drag bar journaled on said boss for movement about a horizontal axis, a shoe arch journaled upon said bar adjacent the free end thereof, a tension rod fixed to the ends of said drag bar and extending therebetween, a cutter bar pivoted to said shoe for swinging movement about a horizontal axis, a lever on said shoe for rotating the shoe around the axis of the bar upon which it is journaled, and a sector fixed on said bar and cooperating with said lever to lock the shoe with respect to the bar.

7. In a mowing machine, a frame fixed upon a tractor, a shoe arch fixed to said frame for swinging movement about a vertical pivot and about a horizontal pivot, a cutter bar pivoted to said shoe arch, a crank arm journaled on said shoe arch, means connecting said crank arm to said cutter bar, a foot lever journaled on said frame, and means whereby an operation of said foot lever operates said crank arms to swing said shoe arch about said horizontal pivot and subsequently to swing said cutter bar with respect to said shoe arch.

8. In a mowing machine, a frame fixed upon a tractor, a shoe arch fixed to said frame for swinging movement about a vertical pivot and about a horizontal pivot, a cutter bar pivoted to said shoe arch, a crank arm journaled on said shoe arch, means connecting said crank arm to said cutter bar, a foot lever journaled on said frame, a segment journaled on said frame, an articulated link connecting said segment to said crank arm, and means on said foot lever operated into engagement with said segment by a movement of the lever whereby the movement of the foot lever is utilized to swing said shoe arch about said horizontal pivot and subsequently to swing said cutter bar with respect to said shoe arch.

9. In a mowing machine, a generally U-shaped frame adapted to be fixed upon a tractor, a turntable pivotally mounted upon said frame for movement about a vertical axis, a cutter bar extending laterally from said tractor, means connecting said cutter bar to said turntable, said means permitting vertical movement of said cutter bar, a lever pivotally mounted upon said frame, an articulated link connecting said lever to said cutter bar, and a spring connected to said lever and said tractor to support a part of the weight of said cutter bar.

10. In a mowing machine, a generally U-shaped frame adapted to be fixed upon a tractor, a turntable pivotally mounted upon said frame for movement about a vertical axis, a cutter bar extending laterally from said tractor, means connecting said cutter bar to said turntable, said means permitting vertical movement of said cutter bar, a lever pivotally mounted upon said frame, an articulated link connecting said lever to said cutter bar, a spring connected to said lever and said tractor to support a part of the weight of said cutter bar, and a foot lever on said frame normally disengaged from said first lever and operable into engagement therewith to raise said cutter bar vertically.

11. In a tractor mounted mowing machine, a frame rigidly fixed on the tractor, a cutter bar mounted for swinging movement with respect to said frame, a pair of parallel shafts journaled on said frame, a sector fixed on one of said shafts, means connecting said sector to said cutter bar, a foot lever journaled on the other one of said shafts, a pawl, and means responsive to a depression of said foot lever for connecting said pawl to said sector whereby the foot lever operates to raise said cutter bar.

12. In a tractor mounted mowing machine, a frame rigidly fixed on the tractor, a cutter bar mounted for swinging movement with respect to said frame, a pair of parallel shafts journaled on said frame, a sector fixed on one of said shafts, means connecting said sector to said cutter bar, a lever journaled on said shaft adjacent to said sector, a foot lever journaled on said second shaft, a link connecting said levers whereby the first lever is moved by the foot lever, and a pawl on said first lever normally disengaged from said sector and moved into engagement therewith by a movement of said lever to operatively connect said foot lever to said cutter bar.

13. In a mowing machine, a frame adapted to be fixed upon a tractor, a casing fixed upon said frame, a turntable journaled in said casing for movement about a vertical axis, a shaft journaled in said casing concentrically of said axis, means including an articulated shaft for connecting said first shaft to the power take-off of said tractor, a cross shaft journaled in said turntable for rotation about a horizontal axis, driving means connecting said vertical shaft to said horizontal shaft, a cutter bar, and means on said horizontal shaft for driving said cutter bar.

14. In a mowing machine, a frame adapted to be fixed upon a tractor, a casing fixed upon said frame, a turntable journaled in said casing for movement about a vertical axis, a shaft journaled in said casing concentrically of said axis, means including an articulated shaft for connecting said first shaft to the power take-off of said tractor, a cross shaft journaled in said turntable for rotation about a horizontal axis, driving means connecting said vertical shaft to said horizontal shaft, a cutter bar, means on said horizontal shaft for driving said cutter bar, and a slip clutch in said articulated shaft for removing power from said driving means when said cutter bar becomes clogged.

15. In a mowing machine, a frame adapted to be fixedly secured to a tractor, a pair of shafts journaled on said frame and disposed transversely of the tractor, a foot lever fixed upon one of said shafts, a sector fixed upon the other one of said shafts, a cutter bar fixed upon said frame for swinging movement about a horizontal axis, means on said foot lever for engaging said sector to raise the same as the foot lever is depressed, and means connecting said sector to said cutter bar whereby the cutter bar is swung about said horizontal axis as the sector is raised.

16. In a mower mounted directly upon a tractor having a power take-off, a frame rigidly secured to the tractor, a cutter bar fixed on said frame for movement about a vertical axis, means including a spring pressed pawl for retaining said cutter bar in a normal position, said means yielding when the cutter bar strikes an obstruction to permit the cutter bar to swing rearwardly of the tractor to clear the obstruction, said cutter bar being restored to and retained in said normal position by a slight rearward movement of the tractor, and means for driving said cutter bar by power received from said power take-off, said means being maintained in driving relation to the cutter bar throughout the movement of the bar around said vertical axis.

17. In a mowing machine, a frame adapted to be fixed upon a tractor, a turntable pivotally mounted upon said frame for movement about a vertical axis, a cutter bar extending laterally from said tractor, means connecting said cutter bar to said turntable, said means permitting vertical movement of said cutter bar, a lever pivotally mounted upon said frame, an articulated link connecting said lever to said cutter bar, and a spring connected to said lever and said tractor to support a part of the weight of said cutter bar.

18. In a mowing machine, a frame adapted to be fixed upon a tractor, a turntable pivotally mounted upon said frame for movement about a vertical axis, a cutter bar extending laterally from said tractor, means connecting said cutter bar to said turntable, said means permitting vertical movement of said cutter bar, a lever pivotally mounted upon said frame, and an articulated link connecting said lever to said cutter bar, the end of said lever being disposed adjacent the vertical axis of said turntable.

19. In a mowing machine, a frame, a cutter bar mounted for swinging movement with respect to said frame, a pair of parallel shafts journaled on said frame, a sector fixed on one of said shafts, means connecting said sector to said cutter bar, a lever journaled on the other one of said shafts, a pawl, and means responsive to actuation of said lever for connecting said pawl to said sector whereby the lever operates to raise said cutter bar.

20. In a mowing machine, a frame adapted to be fixed upon a tractor, a casing fixed upon said frame, a turntable journaled in said casing for movement about a vertical axis, a shaft journaled in said casing concentrically of said axis, means for connecting said first shaft to the power take-off of said tractor, a cross shaft journaled in said turntable for rotation about a horizontal axis, driving means connecting said vertical shaft to said horizontal shaft, a cutter bar, and means on said horizontal shaft for driving said cutter bar.

TALBERT W. PAUL.